United States Patent
Bill

(10) Patent No.: US 9,706,598 B2
(45) Date of Patent: *Jul. 11, 2017

(54) METRIC-BASED WIRELESS NETWORKING

(71) Applicant: Facebook, Inc., Menlo Park, CA (US)

(72) Inventor: David S. Bill, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 668 days.

This patent is subject to a terminal disclaimer.

(21) Appl. No.: 13/826,889

(22) Filed: Mar. 14, 2013

(65) Prior Publication Data

US 2013/0208714 A1    Aug. 15, 2013

Related U.S. Application Data

(63) Continuation of application No. 13/801,544, filed on Mar. 13, 2013, which is a continuation of application
(Continued)

(51) Int. Cl.
| | |
|---|---|
| *H04W 84/10* | (2009.01) |
| *H04L 12/58* | (2006.01) |
| *H04W 4/00* | (2009.01) |
| *H04W 4/02* | (2009.01) |
| *H04W 8/00* | (2009.01) |
| *H04W 4/20* | (2009.01) |

(Continued)

(52) U.S. Cl.
CPC ........... *H04W 84/10* (2013.01); *H04L 12/581* (2013.01); *H04L 12/588* (2013.01); *H04L 51/04* (2013.01); *H04L 51/32* (2013.01); *H04L 67/18* (2013.01); *H04L 67/306* (2013.01); *H04L 69/24* (2013.01); *H04W 4/001* (2013.01); *H04W 4/02* (2013.01); *H04W 4/023* (2013.01); *H04W 4/206* (2013.01); *H04W 8/005* (2013.01); *H04W 84/18* (2013.01); *H04L 12/5895* (2013.01)

(58) Field of Classification Search
CPC ....................................................... H04L 12/581
See application file for complete search history.

(56) References Cited

U.S. PATENT DOCUMENTS

| | | |
|---|---|---|
| 7,190,961 B2 | 3/2007 | Burr |
| 7,619,999 B2 | 11/2009 | DaCosta |

(Continued)

OTHER PUBLICATIONS

U.S. Appl. No. 11/462,298, Feb. 6, 2009, Office Action.
(Continued)

*Primary Examiner* — Huy D Vu
*Assistant Examiner* — Teisha D Hall
(74) *Attorney, Agent, or Firm* — Keller Jolley Preece

(57) ABSTRACT

A first device may communicate by joining a wireless mesh network that includes at least one wireless device configured to operate a wireless routing protocol, discovering a group of other wireless devices configured to participate in the wireless mesh network, and accessing an interest metric for a second wireless device in the group of other wireless devices. The interest metric is based in part on a network topology from the wireless mesh network. The interest metric is related to an interest threshold and it is determined whether relating the interest metric to the interest threshold supports enabling messaging communications. If so, messaging communications may be enabled.

21 Claims, 9 Drawing Sheets

Related U.S. Application Data

No. 12/781,439, filed on May 17, 2010, now Pat. No. 8,547,943, which is a continuation of application No. 11/462,298, filed on Aug. 3, 2006, now Pat. No. 7,720,037.

(51) Int. Cl.
*H04W 84/18* (2009.01)
*H04L 29/08* (2006.01)
*H04L 29/06* (2006.01)

(56) References Cited

U.S. PATENT DOCUMENTS

| | | | |
|---|---|---|---|
| 7,720,037 B2* | 5/2010 | Bill | 370/338 |
| 8,547,943 B2 | 10/2013 | Bill | |
| 2002/0122410 A1 | 9/2002 | Kulikov et al. | |
| 2002/0176399 A1 | 11/2002 | Wilmer | |
| 2004/0018839 A1 | 1/2004 | Andric et al. | |
| 2004/0048605 A1 | 3/2004 | Schaefer et al. | |
| 2004/0110508 A1* | 6/2004 | Haartsen | H04L 5/0005 455/445 |
| 2004/0249953 A1 | 12/2004 | Fernandez et al. | |
| 2005/0002354 A1 | 1/2005 | Kelly et al. | |
| 2005/0048961 A1 | 3/2005 | Ribaudo et al. | |
| 2005/0174975 A1 | 8/2005 | Mgrdechian et al. | |
| 2005/0215250 A1 | 9/2005 | Chava et al. | |
| 2006/0073839 A1 | 4/2006 | Gorday et al. | |
| 2006/0098609 A1 | 5/2006 | Henderson et al. | |
| 2006/0172699 A1 | 8/2006 | Goto | |
| 2006/0218225 A1 | 9/2006 | Hee Voon et al. | |
| 2006/0234631 A1 | 10/2006 | Dieguez | |
| 2007/0066312 A1* | 3/2007 | Shomura | H04W 40/18 455/445 |
| 2007/0105577 A1 | 5/2007 | Bonta et al. | |
| 2007/0225017 A1 | 9/2007 | Li et al. | |
| 2007/0282621 A1 | 12/2007 | Altman et al. | |
| 2008/0051033 A1 | 2/2008 | Hymes | |
| 2008/0062945 A1 | 3/2008 | Ahuja et al. | |
| 2008/0132251 A1* | 6/2008 | Altman | G06Q 30/0207 455/457 |
| 2009/0116430 A1 | 5/2009 | Bonta et al. | |
| 2013/0170393 A1 | 7/2013 | Bill | |
| 2013/0170394 A1 | 7/2013 | Bill | |
| 2013/0194970 A1 | 8/2013 | Bill | |
| 2013/0195095 A1 | 8/2013 | Bill | |

OTHER PUBLICATIONS

U.S. Appl. No. 11/462,298, Aug. 19, 2009, Office Action.
U.S. Appl. No. 11/462,298, Jan. 12, 2010, Notice of Allowance.
U.S. Appl. No. 12/781,439, Jan. 6, 2011, Office Action.
U.S. Appl. No. 12/781,439, Mar. 29, 2013, Office Action.
U.S. Appl. No. 12/781,439, Aug. 1, 2013, Notice of Allowance.
U.S. Appl. No. 13/615,577, Jul. 25, 2014, Office Action.
U.S. Appl. No. 13/615,577, Jul. 24, 2014, Office Action.
U.S. Appl. No. 13/615,577, Jun. 22, 2015, Notice of Allowance.
U.S. Appl. No. 13/615,577, Nov. 14, 2014, Office Action.
U.S. Appl. No. 13/615,577, Mar. 6, 2015, Office Action.
U.S. Appl. No. 13/615,580, Nov. 14, 2014, Office Action.
U.S. Appl. No. 13/615,580, Mar. 4, 2015, Notice of Allowance.
U.S. Appl. No. 13/801,544, Mar. 27, 2015, Office Action.
U.S. Appl. No. 13/826,797, May 21, 2015, Office Action.
U.S. Appl. No. 13/826,797, Dec. 8, 2015, Office Action.
U.S. Appl. No. 13/826,797, Sep. 9, 2016, Office Action.

* cited by examiner

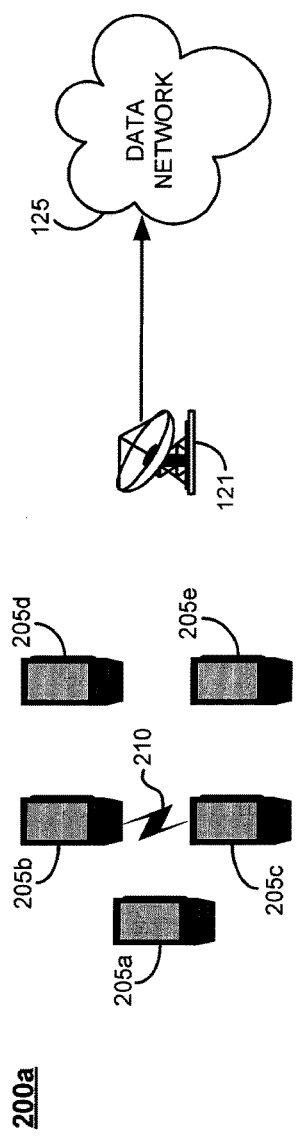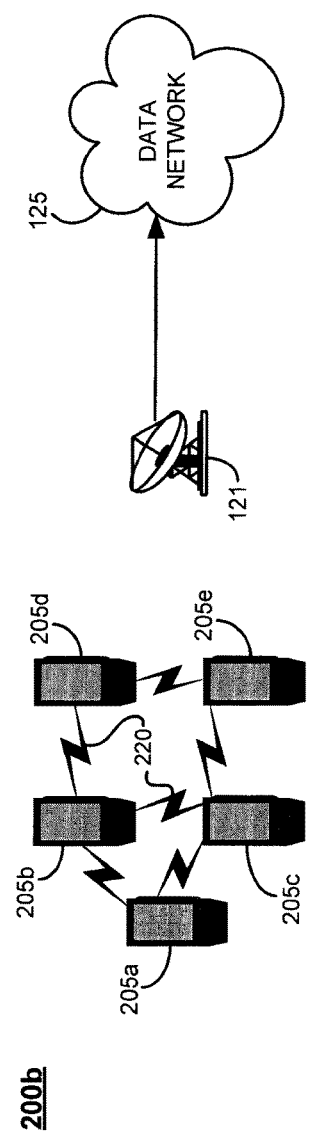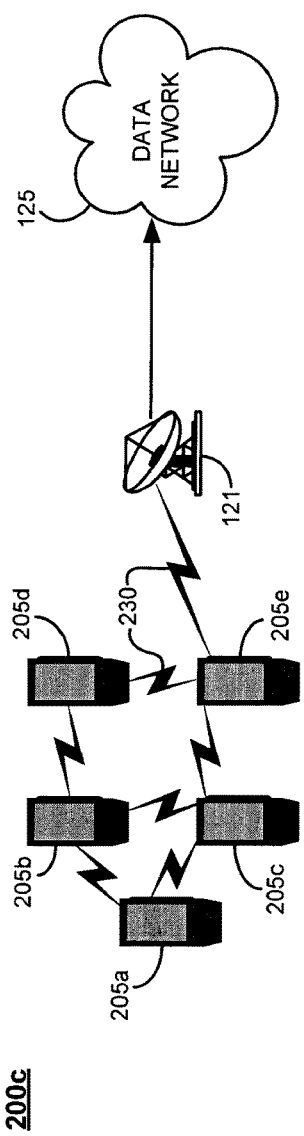

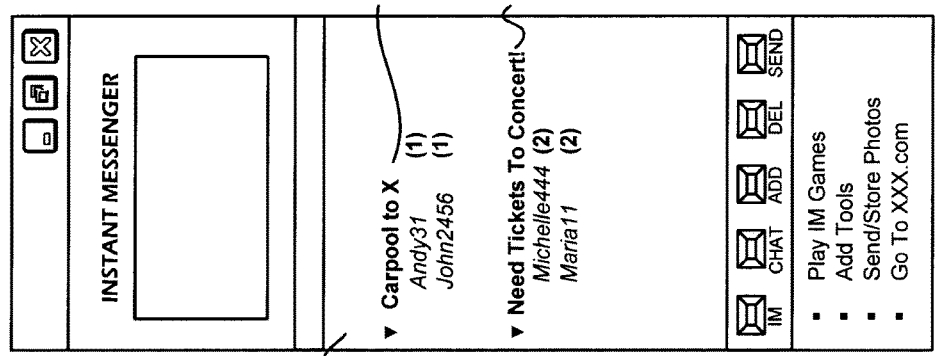
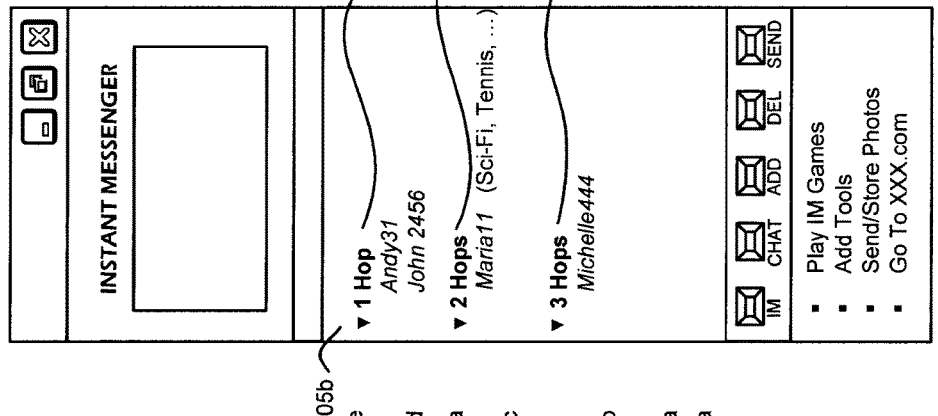
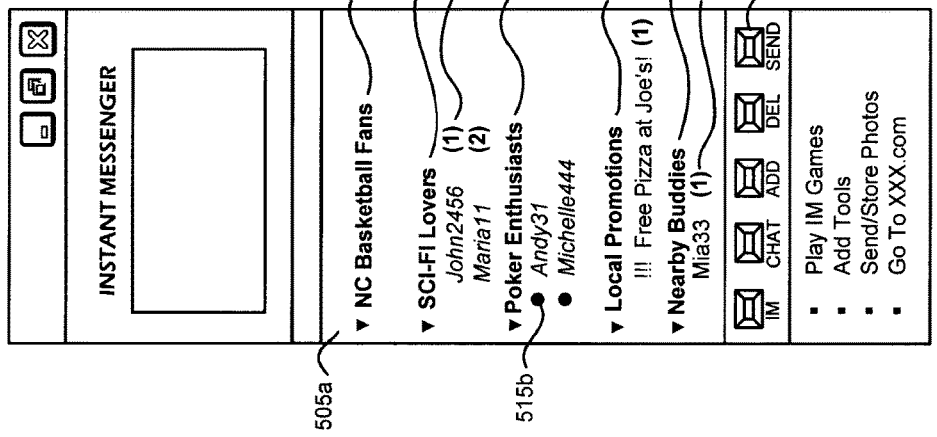

METRIC-BASED WIRELESS NETWORKING

CROSS-REFERENCE TO RELATED APPLICATIONS

This application is a continuation of U.S. patent application Ser. No. 13/801,544, filed Mar. 13, 2013, which is a continuation of U.S. patent application Ser. No. 12/781,439, filed May 17, 2010, which is a continuation of U.S. patent application Ser. No. 11/462,298, filed Aug. 3, 2006, now issued as U.S. Pat. No. 7,720,037. The contents of each of the aforementioned applications and patents are hereby incorporated by reference in their entirety.

TECHNICAL FIELD

This document relates to wireless mesh networks.

BACKGROUND

A wireless mesh network is an autonomous collection of wireless devices that communicate with each other over wireless links. A wireless mesh network may be decentralized, and, as a result, network activity such as discovering the topology and delivering messages is performed by devices of the network.

SUMMARY

In one general sense, a first wireless device may communicate by joining a wireless mesh network that includes at least one wireless device configured to operate a wireless routing protocol, discovering a group of other wireless devices configured to participate in the wireless mesh network, accessing an interest metric for a second wireless device in the group of other wireless devices, wherein the interest metric is based in part on a network topology from the wireless mesh network, relating the interest metric to an interest threshold, determining whether relating the interest metric to the interest threshold supports enabling messaging communications between the first and second wireless devices, and if so, enabling messaging communications to be exchanged between the first and second wireless devices.

Implementations may include one or more of the following features. For example, enabling messaging communications to be exchanged may include rendering an icon representing a communications pathway so that a user may interact with the icon to exchange communications. Accessing the interest metric for the second wireless device may include accessing information that is based at least in part on characteristics of an entity operating the second wireless device. Accessing characteristics of the entity operating the second wireless may include accessing at least one of an entity type, a content type, one or more interests of the entity, and a social interest.

Accessing the interest metric for the second wireless device may include accessing information that is based at least in part on a geographic location of the second wireless device. Accessing information that is based at least in part on the geographic location of the second wireless device may include accessing at least one of a zip code, a state, a region, a street address, and a location based on a Global Positioning Signal.

A participant list perceivable to the user may be rendered. Rendering the participant list may include identifying users, organizing identified users into categories based on network proximity, and displaying information for identified users. Identifying users may include accessing privacy settings for the users being identified. Organizing the identified users into categories may include rendering the identified users based on the privacy settings. Organizing the identified users may include also organizing the identified users by associated interest metrics.

DESCRIPTION OF DRAWINGS

FIGS. 2A-2C are exemplary block diagrams illustrating a sequence of configurations in a wireless mesh network.

FIGS. 5A-5C are exemplary graphical user interfaces for a messaging application that indicates proximity information in a wireless mesh network.

DETAILED DESCRIPTION

Figure 1:
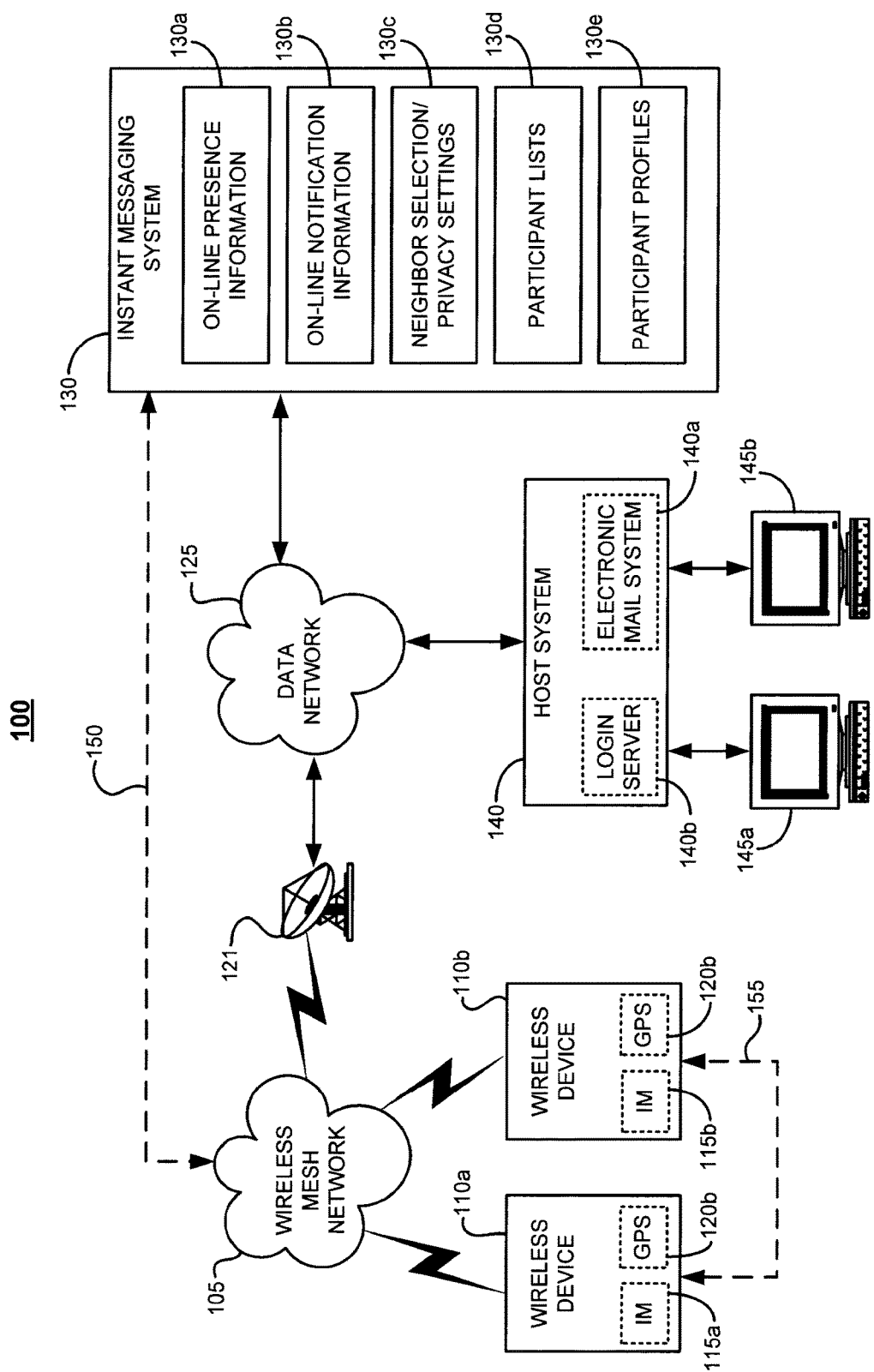
FIG. 1 is an exemplary block diagram of a communications system enabling exchange of instant messages in a wireless mesh network.

A user with a wireless device joined to a wireless mesh network may desire to communicate with other users on other wireless devices in the wireless mesh network. For example, a user may desire to exchange communications with other users that have expressed similar interests or that are proximate to the user's location. However, depending on a user's preferences, the size of the wireless mesh network, and other factors, a user may find it difficult to engage in communications with other users in the wireless mesh network. In some instances, it may be difficult to even identify other users in the wireless mesh network. In other instances, a user may experience difficulty in identifying users with similar interests. For example, a user may find it difficult to navigate among large volumes of information for a large population in the wireless mesh network. And, even when other users with similar interests can be identified, it may be difficult for a user to identify which of the other users are proximate to the current user.

Thus, in a wireless mesh network in which a user on a first wireless device has joined a wireless mesh network, the first wireless device may first discover a group of other wireless devices. For example, the first wireless device may use a wireless routing protocol and identify other wireless devices that also are participating in the wireless mesh network. The wireless device may access an interest metric for a second wireless device in the group of other wireless devices. The interest metric may be based in part on a network topology from the wireless mesh network. For example, an interest metric may indicate that the second wireless device is located a specified number of "hops" away from the first wireless device. The interest metric is related to an interest threshold. For example, an instant messaging application may determine whether another wireless is located less than five "hops" away and worthy of display in an instant messaging application. As a result, a determination may be made as to whether relating the interest metric to the interest threshold supports enabling messaging communications between the first and second wireless devices. If so, the user may use the first wireless device to exchange messaging communications with the second wireless devices.

In one implementation, representations of other wireless devices in the wireless mesh network are organized into a group. For example, a list of co-users (e.g., a buddy list) may be configured to render group members in a messaging interface (e.g., an instant messaging application). The wireless device also may enable messaging communications between wireless devices based at least in part on an interest metric that reflects a user's preferences. The interest metric also may be based at least in part on a network topology, and also may reflect other factors, such as the geographic location of the neighboring wireless devices or user interest(s).

In one implementation, wireless mesh network proximity may be used as a proxy for geographic proximity. For example, if a wireless device is not equipped with a GPS system, it may be difficult to determine the relative geographic proximity of wireless devices. And, as wireless devices may only operate over a limited geographical range, a wireless device may identify geographic neighbors based on the network "distance" (e.g., number of hops, available bandwidth) to these neighbors. Thus, a first wireless device may determine that a second wireless device is located two network "hops" (e.g., links) away and that a third wireless device is ten network hops away. As a result, the first wireless device may use the indication of network proximity as an indication of geographic proximity.

Privacy may be preserved using a privacy configuration that may vary between different groups. The privacy configuration also may reflect network proximity and other factors.

FIG. 1 is an exemplary block diagram of a communications system enabling exchange of instant messages in a wireless mesh network 105. The communications system 100 includes a wireless mesh network 105, wireless devices 110a and 110b, a data network 125, an instant messaging system 130, a host system 140, and computers 145a and 145b. The data network 125 may include the Internet or a Public Switched Telephone Network (PSTN). The wireless mesh network 105 may connect to the data network 125 through a wireless access point 121 (e.g., wireless devices 110a and 110b). In general, the wireless mesh network 105 is an autonomous collection of wireless devices 110 that exchange communications other over wireless links. The wireless mesh network 105 may be decentralized, such that discovering a network topology and exchanging messages is performed by the wireless devices 110a and 110b. In addition, when decentralized routing and message delivery communications are used, wireless communications in the wireless mesh network 105 do not depend on distance to the nearest access point or base station. Rather, they depend upon the distance to the next wireless device.

Each of wireless devices 110a and 110b may include a wireless routing code segment to exchange communications. Wireless devices 110a and 110b also may include instant messaging modules 115a and 115b, respectively, which enable wireless devices 110a and 110b to communicate with one another using instant messages without requiring interaction with the instant messaging system 130. In one implementation, either or both of the wireless devices 110a and 110b may be configured to provide other devices in the communication system 100 with location information (e.g., GPS coordinates). For example, each of the wireless devices 110a and 110b may include a global positioning system (GPS) receiver 120a or 120b that determines a geographic location.

The instant messaging system 130 enables users of computers 145a and 145b, as well as users of wireless devices 110a and 110b, to exchange instant messaging communications. A user on computer 145a may sign in to a host system 140 that provides a connection to the data network 125. In one implementation, the host system 140 is operated by an Internet service provider (ISP) that also provides an electronic mail system 140a. Since the instant messaging system 130 also is connected to the data network 125, computers 145a and 145b may be indirectly connected to the instant messaging system 130, thereby enabling users of the computers 145a and 145b to communicate using instant messages. In addition, instant messaging system 130 may be connected to the wireless mesh network 105. This enables users of the wireless devices 110a and 110b to communicate using instant messages without requiring use of a land-based network.

The instant messaging system 130 includes on-line presence information 130a that indicates the on-line presence of users. The on-line presence of a user refers to the availability of the user to communicate using, for example, instant messaging system 130. In addition, the instant messaging system 130 includes on-line notification information 130b that indicates notification preferences regarding the on-line presence of different users. The on-line notification information 130b permits a user to selectively release identification information.

Similarly, the instant messaging system 130 may include neighbor selection/privacy settings 130c. Using neighbor/privacy settings 130c, a user may specify preferences that control how the neighbors are identified during the neighbor discovery in the wireless mesh network. For example, the neighbor selection settings 130c may include interest metrics that organize neighbors into specific participant lists or groups. In addition, neighbor selection/privacy settings 130c may relate to a user's on-line IM settings or user's general mesh network privacy settings. For example, a user may enable on-line presence information for the user be shared with others, including a subset of co-users on a co-user list (e.g., a Buddy List) that is included in a set of participant lists 130d.

The instant messaging system 130 also may store participant profiles 130e. Participant profiles 130e may include information about users, such as age, interest, hobbies, system preferences, and other information pertinent to a user's on-line presence.

As mentioned above, the communications system 100 also includes the host system 140 to which computers 145a and 145b may be connected. Users of the computers 145a and 145b have accounts with the host system 140. The host system 140 may be configured to support authenticated access, where a login server 141 of the host system 140 verifies authentication information during login. If the login server 141 verifies the authentication information, then the computer providing the authentication information is allowed to access the host system 140.

The host system 140 also includes an electronic mail system 142 that may be accessed by users of the computers 145a and 145b to send and receive electronic mail. Users of the wireless devices 110a and 110b also may access the electronic mail system 142 to exchange and receive electronic mail using the wireless devices 110a and 110b.

After logging in, users of the computers 145a and 145b (or the wireless devices 110a and 110b) may access the instant messaging system 130. Alternatively or in addition, the wireless devices 110a and 110b may communicate with each other without using instant messaging system 130, instead using a peer-to-peer capability in instant messenger modules 115a and 115b. If the peer-to-peer capability in instant messenger modules 115a and 115b is used, communications between wireless devices 115a and 115b may be transmitted through communication pathway 155 that represents a communication path across a wireless mesh network.

FIGS. 2A-2C are exemplary block diagrams illustrating a sequence of configurations in a wireless mesh network 105 that includes wireless devices 205a-2053. As shown in FIG. 2A, a discovery process has begun with establishment of a small wireless mesh network 200a that includes an ad-hoc connection 210. As shown, the network 200a is a two-node network between wireless devices 205b and 205c.

As shown in FIG. 2B, more devices have joined the wireless mesh network and a larger wireless mesh network 200b has been formed. The network 200b includes connections between the wireless devices 205a-205e. FIG. 2C illustrates that the wireless mesh network 200c has grown further to reach the wireless access point 121, thereby enabling wireless devices to access the data network 125.

The wireless mesh network 105 may include at least one wireless device that is configured support a wireless routing protocol or a subset of a wireless routing protocol so that, for example, the wireless device may act as a wireless routing client in a wireless mesh network where the wireless client is not configured to perform more computationally burdensome routing calculations. The wireless device may include a device dedicated solely to wireless communications (e.g., a wireless access point 121). Alternatively, the wireless device may be used for other applications and communications, such as wireless device 205b. The wireless device may be configured to disseminate routing information to other wireless devices. For example, a wireless router may store information about the topology of the wireless mesh network 105 and assist proximate wireless devices in discovering wireless neighbors.

In addition, the wireless router may identify data paths in the wireless network 105. For example, identifying data paths in the wireless mesh network 105 may include administering a self-configuring wireless routing protocol, such as a version of Routing Information Protocol (RIP) adapted to ad-hoc wireless networks. Examples of other wireless routing protocols that be used include TORA ("Temporally-Ordered Routing Algorithm") and AODV ("Ad-hoc On-demand Distance Vector").

A wireless devices 205a-205e joining a wireless mesh network 105 may discover a group of other wireless devices configured to participate in the wireless mesh network. In one example, a wireless device may discover other wireless devices by broadcasting "HELLO" advertisements. In another example, the wireless device may discover other wireless devices by querying a wireless router, and/or by using other discovery techniques. In addition to discovering direct neighbors (i.e., the neighboring wireless devices with whom wireless device 205a may directly exchange communications), a wireless device in the wireless mesh network may discover a network topology for a larger wireless mesh network with wireless devices that are not directly accessible.

Peer propagation techniques may be used to generate a network topology. For example, if wireless device 205a in FIG. 200C attempts to discover the wireless devices within N hops of itself, the wireless device 205a may send a discovery packet to each of its direct neighbors. As neighbors, wireless devices 205b and 205c reply to device 205a with the network topology information for wireless devices 205d and 205e. The information may include the number of hops, and/or the available link bandwidth to wireless devices 205d and 205e. In addition, wireless devices 205b and 205c may further propagate a discovery packet to wireless devices 205d or 205e, which may in turn inform the wireless device 205a of known neighbors. Thus, the propagation of the discovery package may continue until the discover packet has propagated the specified number of "hops."

However, wireless devices that are further than N hops away from wireless device 205a may stop propagating the discovery packet to avoid flooding device 205a with too much discovery information. When a predetermined number of the wireless device's neighbors have replied, the wireless device 205a may have sufficient information to generate the network topology. The network topology may include a list of neighboring devices within a predetermined number of hops to wireless device 205a and associated link costs. In another example, the network topology reflects available bandwidth to neighboring devices.

Figure 3:
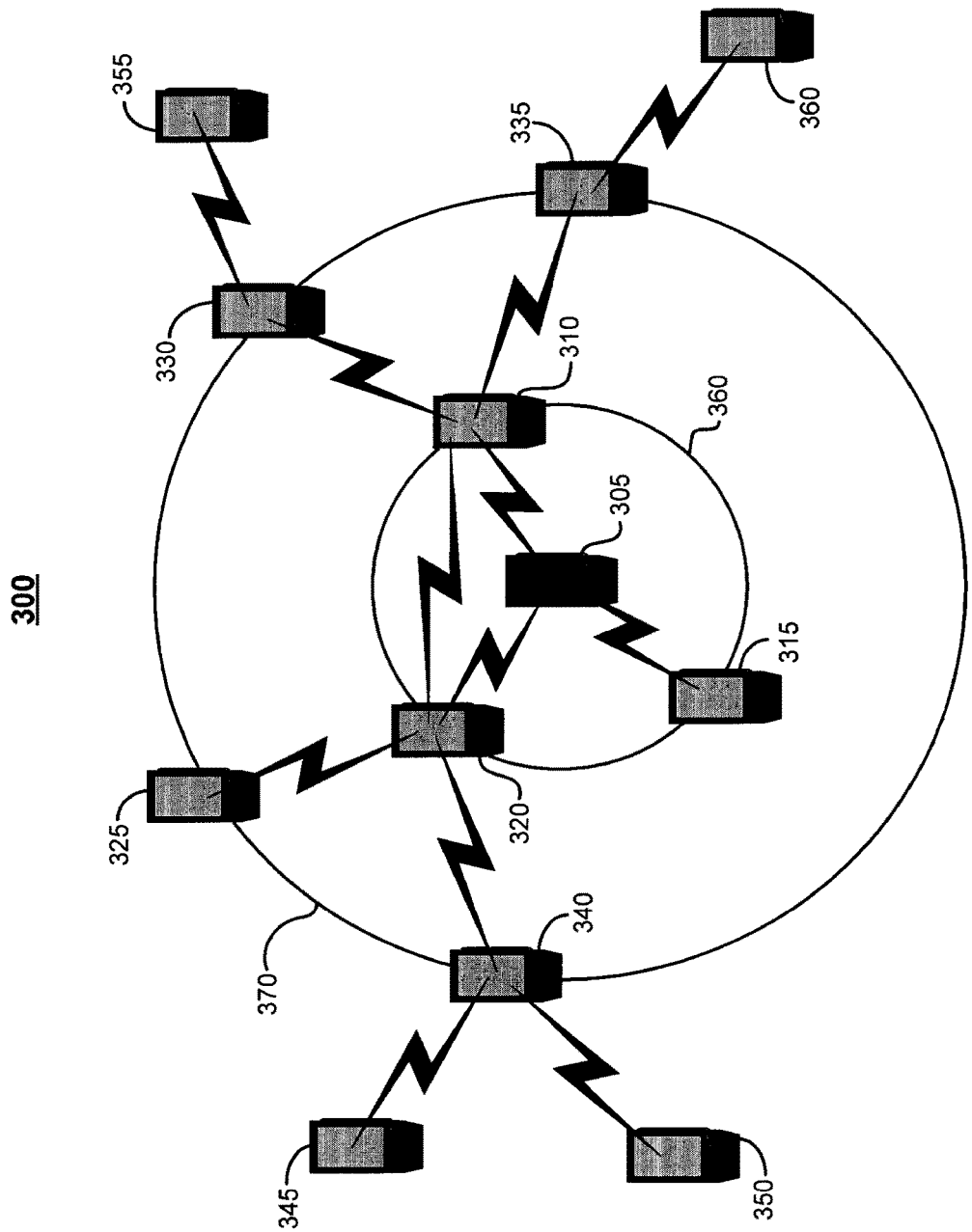
FIG. 3 is an exemplary network topology of a wireless mesh network.

FIG. 3 is an exemplary network topology of a wireless mesh network 105. Specifically, FIG. 3 illustrates how a wireless device 305 computes the network topology from the point of view of the wireless device 305 after performing network discovery. The wireless device 305 may assign interest metrics to wireless neighbors. The wireless neighbor's interest metrics may be used to indicate whether the wireless device 305 should foster or enable messaging communications with that wireless neighbors corresponding to the interest metrics. In general, the wireless device 305 may enable messaging communications with wireless neighbors that have higher interest metrics and avoid enabling messaging communications with wireless neighbors with lower interest metrics. The determination of enabling messaging communications may be performed by comparing an interest metric to a threshold. For example, if the interest metric for a wireless neighbor device is greater or equal to the threshold, then the wireless device 305 enables messaging communications with that neighbor device. On the other hand, if the interest metric for the neighbor is smaller than the threshold, then the wireless device 305 disables messaging communications with that neighbor device.

The interest metric may be based in part on a network topology from the wireless mesh network 105. For example, some neighbors discovered by wireless device 305 may be topologically closer than others. From the perspective of wireless device 305, the interest metrics of other wireless devices may be determined using proximity indicators, such as a number of hops or an available bandwidth to the wireless devices. For example, wireless devices 310, 315, and 320 are located within a single network hop of the wireless device 305, as also indicated by the circle 360. Similarly, wireless devices 325, 330, 335, and 340 are located within a two-hop radius of device 305, since they are separated from the wireless device 305 by two hops, as also indicated by the circle 370. Other devices, such as devices 345, 350, 355 and 357, are outside the two-hop radius.

Wireless device 305 may be configured to only enable messaging communications with the neighbors within its N-hop radius. For example, the wireless device 305 may elect to only communicate with neighbors within two hops in order to avoid long network or processing delays when exchanging voice, video information, or other bandwidth-intensive content. In such instances, a neighbor's network proximity (e.g., the number of hops away) may be used to represent geographic proximity. However, in a wireless mesh network, knowledge of a particular geographic operating range may be used to determine geographic neighbors based on a network distance. For example, a wireless device that is two network hops away is likely to be geographically closer than a wireless device that is ten network hops away.

The interest metric also may be based on neighbor characteristics. For example, neighbor characteristics may include neighbor types, such as "business," "individual," or "advertiser." In addition, neighbor types may be further subdivided or categorized into sub-types by a variety of characteristics. In one example, the neighbor type "restaurant" may be sub-divided into multiple sub-groups, such as "Italian," "That," "French," and others. In another example, the neighbor characteristics depend on the content advertised by the neighbor, such as the specific value of store discounts. In addition, the neighbor characteristics may indicate a neighbor's interests or social activities, such as interests in poker, science fiction, or kung-fu movies. The user may assign different interest metrics to different neighbor characteristics. Hence, the user may set the interest metrics to the highest value for the individuals interested in poker, the medium value for the stores advertising free pizza, and the smallest value for stores advertising discounts on winter clothes that are less than 20% off. As a result, the wireless device 305 may prevent messaging communications with the stores advertising discounts on winter clothes, because these stores' have interest metrics that are too low for the user.

Finally, enabling communications based at least in part on network proximity may also assist businesses in identifying potential customers. In one example, the owner of a pizzeria may only want to advertise a "7:30 special" to the customers who are close-by to the pizzeria to avoid advertising to customers who are too far away to take advantage of the "7:30 special." In another example, a department store with a large number of diverse products may tailor its promotional advertisements to the customers shopping within specific store sections. Hence, customers shopping in a "Women's Shoes" section may receive advertisements that are different from advertisements received by customers shopping in a "Men's Suits" section.

Figure 4:
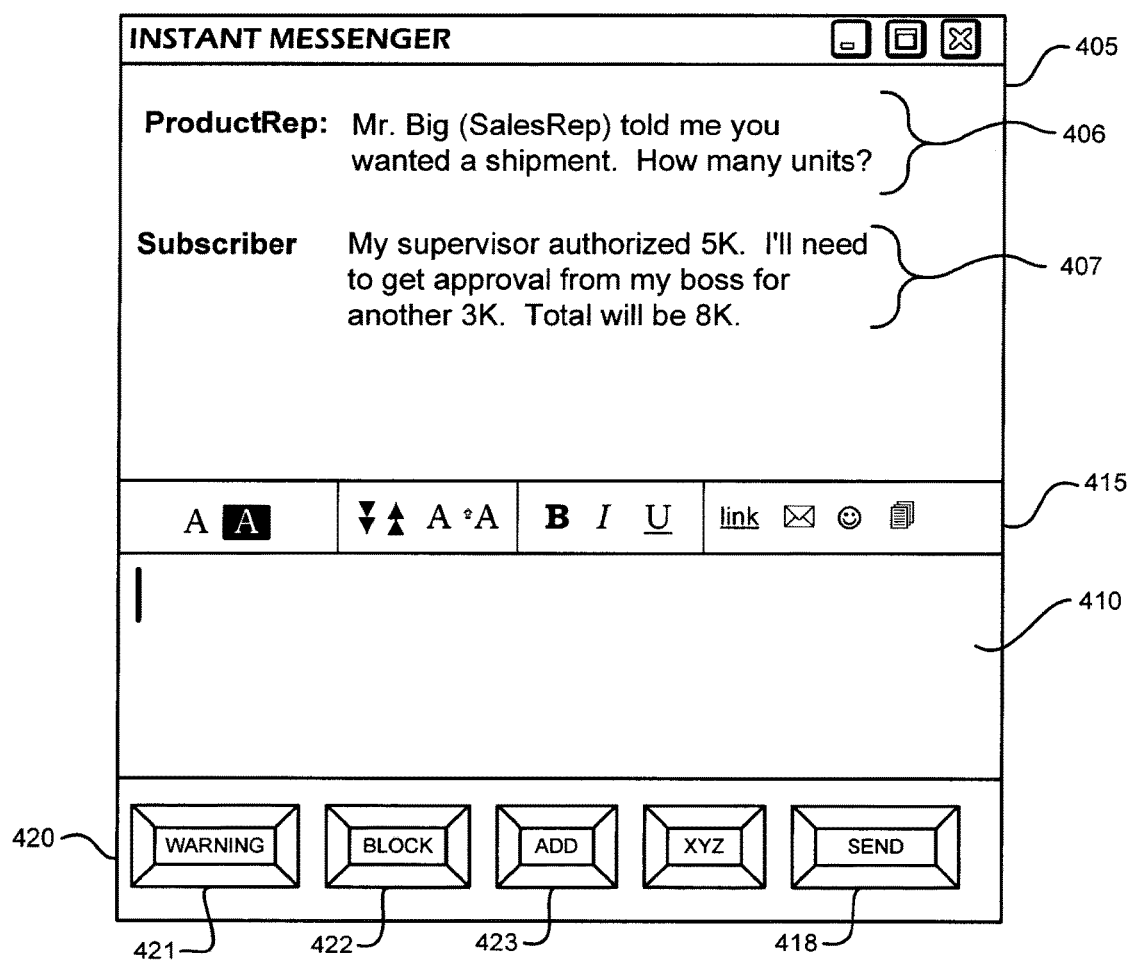
FIG. 4 is an exemplary graphical user interface configured to exchange instant messages.

FIG. 4 shows an exemplary graphical user interface 400 configured to exchange instant messages. After a sender of instant messages is notified that a recipient is "present" and available to exchange instant messages, the sender may use the instant messaging interface 400 to exchange instant messages with the recipient. The instant messaging interface 400 includes a message history box 405 that lists the instant messages sent between the sender and the recipient. The message history box 405 also may be referred to as a message transcript box 405. As shown, each message is presented with an indication of a screen name by which the sender or the recipient is identified as the source of the message. Each message listed in the message history box 405 also includes the text of the instant message sent by the sender or the recipient. For example, the message history box 405 includes a message 406 sent by a user with a screen name "ProductRep" and a message 407 sent by a user with a screen name "Subscriber." The users exchanging messages 406 and 407 are, respectively, the sender and the recipient. In one implementation, each message listed in the message history box 405 includes a time stamp of when the message was sent.

The instant messaging interface also includes a message specification box 410 in which the sender generates a message to be sent to the recipient. The sender may enter text to be sent to the recipient in the message specification box 410. The instant message interface 400 includes a set of format controls 415 that may be used to format the text entered in the message specification box 410. More particularly, the format controls 415 enable the user to change the size, foreground color, background color, style, and effects of the text entered in the message specification box 410. The format controls 415 also permit the insertion of items that are not plain text, such as hyperlinks and emoticons, into the message specification box 410.

After a message has been specified in the message specification box 410, it may be sent by selecting a send button 418 included in a second set of controls 420. After the send button 418 has been selected, the text that has been entered in the message specification box 410 is sent to the recipient, the message specification box 410 is cleared, and the message is added to the message history box 405. The message also is displayed in a message history box 405 of an instance of the instant messaging interface 400 being viewed by the recipient. Also included in the second control set 420 are controls for warning (421) or blocking (422) instant messages or adding (423) the recipient to a participant list maintained by the sender.

In one implementation (not shown), the communications interface provides information descriptive of the communications pathway. For example, an instant message interface may indicate (1) that the remote user is a specified number of hops away, (2) that a specified bandwidth is available across the communications pathway, and (3) that the communications pathway supports one or more of the following applications. Displaying information related to the communications pathway may include updating the displayed information as the network topology changes.

FIGS. 5A-5C show exemplary graphical user interfaces for a messaging application that indicates proximity information in a wireless mesh network 105. Specifically, instant messaging system 130 may organize users based on various interest metrics. The identities appearing in the co-user list 505 may be separated into one or more groups based on various interest metrics, such as network proximity to the user, network proximity combined with geographic proximity, or neighbor characteristics.

For example, the co-user list 505a in the participant list interface 500A includes a "Nearby Buddies" group 510a, a "Local Promotions" group 510b, a "Poker Enthusiasts" group 510c, a "Sci-Fi Lovers" group 510d, and a "NC Basketball Fans" group 510e. The identities are organized in groups based on interest metrics, activity interests, and/or other characteristics. For example, the identities appearing in the "Nearby Buddies" group 510a may be identified in response to a determination that of whether a wireless device associated with an identity is located within a predetermined threshold, as evidenced by the proximity indicator icon 515a. On the other hand, the identities in "Sci-Fi Lovers" group 510d share an interest in science fiction, as indicated in an online profile.

In addition, some groups may be generated by virtue of a business interest. For example, a group selection protocol may distinguish between business users and consumers. The "Local Promotions" group 510b includes business identities, advertisements, and/or promotions from business entities in the wireless mesh network. For example, "Joe's" may solicit the nearby users in a wireless mesh network by transmitting information related to current promotions, such as a free pizza with some additional purchase (510b).

A proximity indicator 515a may include a graphical or alphanumerical representation of a neighbor's proximity to the user. For example, the proximity indicator 515a may show the number of network hops from the user to a neighbor. Additionally or alternatively, the proximity indicator 515b may use color or another graphical representation to indicate a relative distance to a neighbor, as illustrated by a circular proximity indicator 515b. For example, a green circle indicator 515b may indicate a nearby neighbor, while a red circle indicator 515b may indicate a distant neighbor.

In another implementation, as shown in FIG. 5B, a participant list interface 500b may include a co-user list 505b that is organized based on network proximity to neighbors. For example, neighbors within one network hop of the user may be listed in "1 Hop" group 520a, while neighbors within two network hops of the user may be listed in "2 Hop" group 520b. Such organization of the network neighbors may enable the user to quickly determine the closest neighbors in the wireless mesh network.

In yet another implementation, as shown with respect to the participant list interface 500c of FIG. 5C, in addition to network proximity, the identities appearing in the co-user list 505C may be further organized based on an advertised interest/social activity. For example, users may organize themselves into activity groups by broadcasting a desire to engage in a specific social activity, such as carpooling, playing sports, or going to a concert. By enabling a user to specify a social activity, a user may walk into a book store and search for other users with wireless devices who wish to play a pick-up game of softball at a nearby park. In another example, GUI 500c includes a "Carpool to X" group 530 having members who are users with proximate wireless devices looking to share a ride to location X. GUI 500c also includes a "Need Tickets to Concert!" group 540 that is made up of users wishing to purchase tickets to a specific music concert.

Each of GUIs 500A-500C also may include a setup button 550 that may be selected to enroll in or start a group. In one implementation, selecting the setup button 550 displays an interface for specifying neighbor selection settings (e.g., neighbor selection privacy settings shown in FIG. 1).

Figure 6:
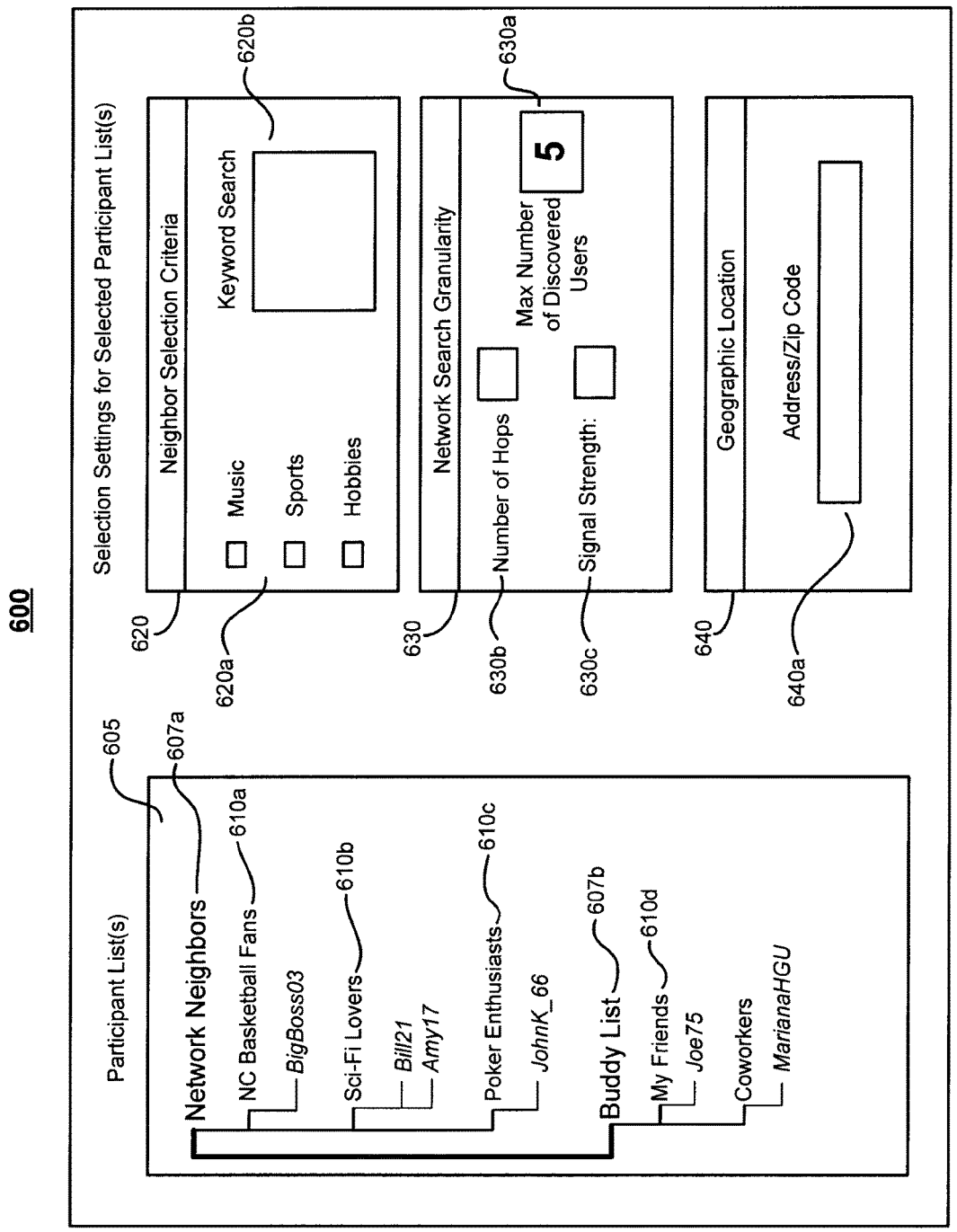
FIGS. 6-7 are graphical user interfaces that enable a user to specify neighbor search and privacy preferences in a wireless mesh network.

FIG. 6 shows a graphical user interface 600 that enables a user to specify neighbor search settings in a wireless mesh network 105. A user may interact with GUI 600 to specify interest metrics, which in turn, place neighbors into a specific coverage list and/or group. GUI 600 may be used to control how a user interacts with instant messaging system 130, and may be rendered, for example, on the wireless device 110a, the computer 145a, or the host system 140 described previously with respect to FIG. 1. The settings rendered in GUI 600 may be locally stored or stored online (e.g., in on-line notification information 130b in FIG. 1).

GUI 600 includes a co-user list window 605 of identities managed by the user. A co-user list may be configured to include identities of people with whom the user exchanges communications and/or identities associated with mesh network neighbors. A co-user list or group may be generated or populated dynamically (e.g., based on identification of other users with similar interests (607a)), and/or statically, based on pre-defined co-user lists from the messaging system (607b). Interest metrics for listing and grouping identities may include network proximity, geographic proximity, social activities, and/or other information available from another user's profile. For example, co-user list window 605 includes groups 607a and 607b. The "Network Neighbors" group 607a is associated with wireless devices of neighbors having similar interests, such as those included on a "North Carolina basketball fans" list 610a, a "Science Fiction Lovers" list 610b, and a "Poker Enthusiasts" list 610c.

In some implementations, the GUI 600 includes a neighbor selection criteria window 620. The user may select from one of the pre-determined interests in neighbor selection section 620a, and may limit a discovery process to other users sharing the specified types of interests. For example, a user may choose "90's rock music" as one of the required categories in the window 620. As a result of this selection, only the neighbors who have specified that they listen to "90's rock music" are presented to the user in response to the discovery of other wireless devices. In yet another implementation, a user specifies a set of keywords in a keyword specification section 620b to ensure that the specified keywords are used during searches for neighbors with similar interests. Using keywords may enable a user to perform a more detailed search in identifying other users. In one implementation, the keyword specification section 620b enables the user to specify the search terms using regular or Boolean expressions to improve the utility of the search.

GUI 600 includes a network search granularity specification window 630. A user may configure options in the network search granularity specification window 630 to specify the network-specific attributes. For example, the user may attempt to avoid overpopulating a list or a group by setting the limit on the number of per-list/group neighbors using a "maximum number of discovered users" setting section 630a. In one specific example, as shown in FIG. 6, the user may specify a maximum limit to be at most five North Carolina fans at a time. In addition, the user may limit the discovery process for other wireless devices by specifying that only neighbors within a certain N-hop radius be included in the co-user list section 605 (630b). In yet another example, the user may wish to limit the selection process to other wireless devices associated with a prerequisite signal strength (630c). Requiring a prerequisite signal strength may ensure that the user maintains sufficient bandwidth with the neighboring wireless devices for voice or video communications. Requiring a prerequisite signal strength also may favor neighboring devices that are geographically close to the user. In another implementation, the user may specify a distance that is used as an indication of proximity. The wireless device may be configured to relate the specified distance to network proximity using the approximate range of intervening networks to quantify the specified distance according to network proximity metrics.

Still, in other implementations, GUI 600 specifies a geographic location that is used during the process of neighbor search and discovery. As shown in GUI 600, an address window 640 enables the user to enter a desired address and/or zip code so that neighbor discovery in the wireless mesh network is responsive to a specified geographic location. For example, a user may use a zip code to express a demographic profile, limit results to a particular geographic area, and/or limit results to users associated with a particular geographic area.

In yet another implementation, the co-user list represents mixed types of users. For example, a user's instant messaging account may include the participant list 610d from an instant messaging system and a participant list 610a based on wireless mesh network topology.

In still another implementation, a wireless device may only display a limited number of entries in a co-user list (e.g., a buddy list with screen names) where a larger number of identities are available. In selecting a subset of identities to display, the co-user list may be configured to select identities based on wireless network topology information. For example, a wireless device may be configured to display the closest X number of users where X represents a number of entries that may be displayed. Alternatively, a user on a wireless device may prefer a degree of anonymity and being further away from other users with whom the user is exchanging communications. As a result, the wireless device may be configured to display (1) identities associated with other wireless devices that are between X and Y hops away or (2) identities that are at least Z hops away. In yet another implementation, the wireless device may be configured to display a list of close friends at all times in a first group of identities, and to display the closest N users in a second group of identities.

Figure 7:
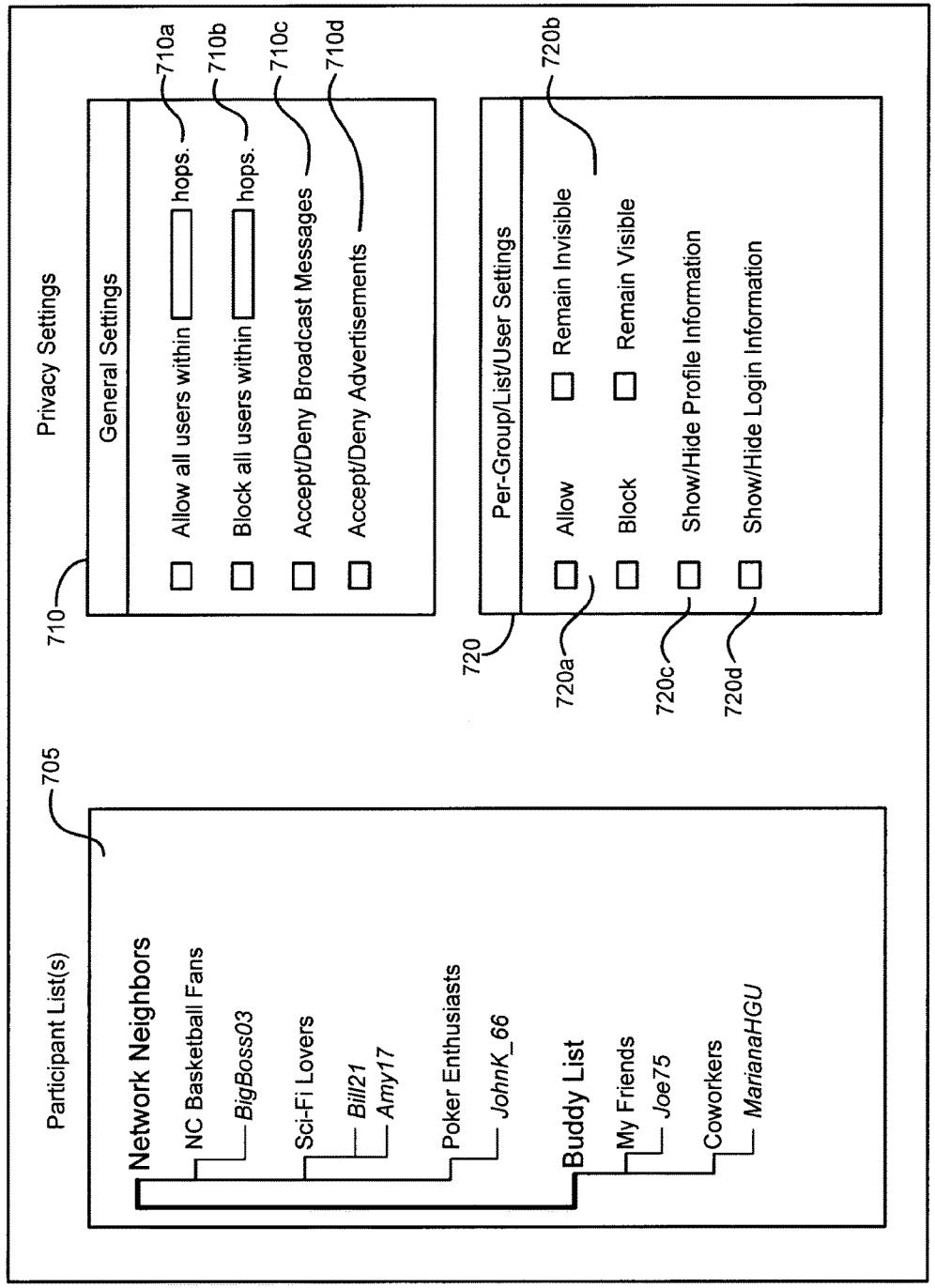

FIG. 7 illustrates a graphical user interface 700 that enables a user to specify privacy preferences in a wireless mesh network 105. The privacy settings may relate to a user's on-line instant messaging settings and/or a user's general mesh network privacy settings. GUI 700 may be rendered so that a user may interact with the instant messaging system 130, using, for example, the wireless device 110a or 110b, the computer 145a or 145b, and/or the host system 140 that is described with respect to FIG. 1. In one implementation, the neighbor selection settings specified through GUI 700 are stored in the on-line notification information 130C of FIG. 1.

GUI 700 includes a participant list 705 and a general privacy setting window 710. The participant list (or co-user list) 705 includes a list of online identities for other users. The general privacy setting window 710 may be used to specify preferences related to a general behavior of a user's wireless device in a wireless mesh network. For example, the user may enable instant messaging with users located within the specified N-hop radius of the user in the wireless network (710a). Enabling instant messaging within the specified N-hop radius may enable perception of presence information and/or the exchange of messages from the proximate neighbors, thereby enabling the user to exert a great desire of control.

Alternatively, in a large wireless mesh network, a user may preserve a greater desire of privacy and may avoid neighbors located further away. For example, a user may block distribution of identification information for users located beyond the N-hop radius of the user in the wireless network (710b). The user also may specify preferences with regard to broadcast (710c) or advertisement messages (710c-d). Broadcast messages may include communications intended for all proximate wireless devices. For example, a wireless neighbor may ask proximate wireless devices for directions to place X or a recommendation for a nice restaurant, or may broadcast a desire to sell/purchase concert tickets. However, a user may elect to avoid these and other types of broadcast inquiries by blocking broadcast messages via a broadcast message selection box 710c. Similarly, the user may choose to avoid advertising messages from vendors via an advertisement message selection box 710d. While an advertisement may be similar to or sent as broadcast messages, advertisements generally are deemed to originate from commercial organizations.

Alternatively or in addition, GUI 700 includes a per group/list/user privacy setting window 720. Privacy setting window 720 enables a user to specify privacy settings for a particular group, list, and/or user. For example, a user may highlight a group in the participant list 705 and specify privacy settings for the highlighted group. The user may allow or block messages arriving from specific groups, lists, or users (720a). In addition, the user may elect to remain visible/invisible (or use a non descript or one-time identity) to the highlighted group (720b). If the user elects to be invisible, network presence is not conveyed to the highlighted group. In addition, the user may elect to show/hide a profile (720c) or login (720d) information from the highlighted groups. When the user elects to hide a profile or login information, other users are not able to view the user's profile or track the user's login/logout times. In yet another implementation, the user may specify that (1) the user's identity should be invisible to a first group of users (e.g., wireless devices more than a specified actual or network distance away), (2) that a nondescript identity should be used for a second group of users (e.g., wireless devices located more than a first threshold number of "hops" away and less than a second threshold number of "hops" away), and (3) the user will reveal a persistent identity to a third group of users (e.g., selectively reveal a favored screen name to users located less than the first threshold number of hops away).

Figure 8A:
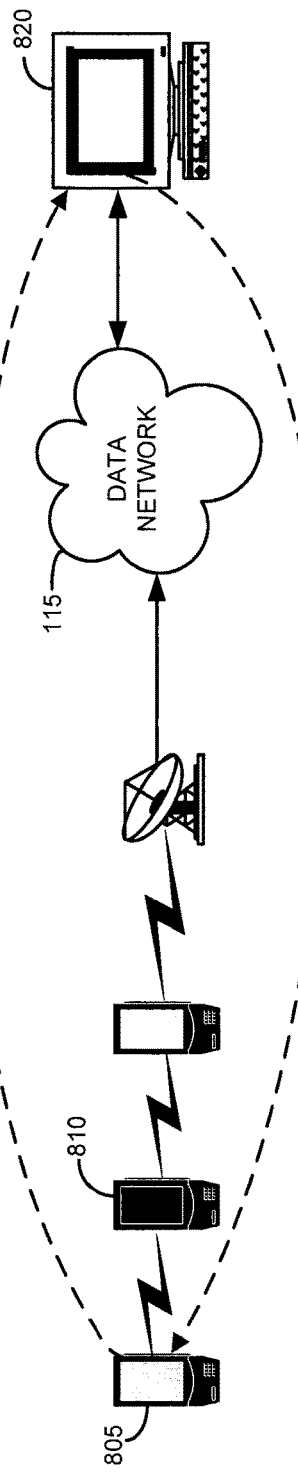
FIGS. 8A-8C are diagrams illustrating the distribution of information in a wireless mesh network.
Figure 8C:
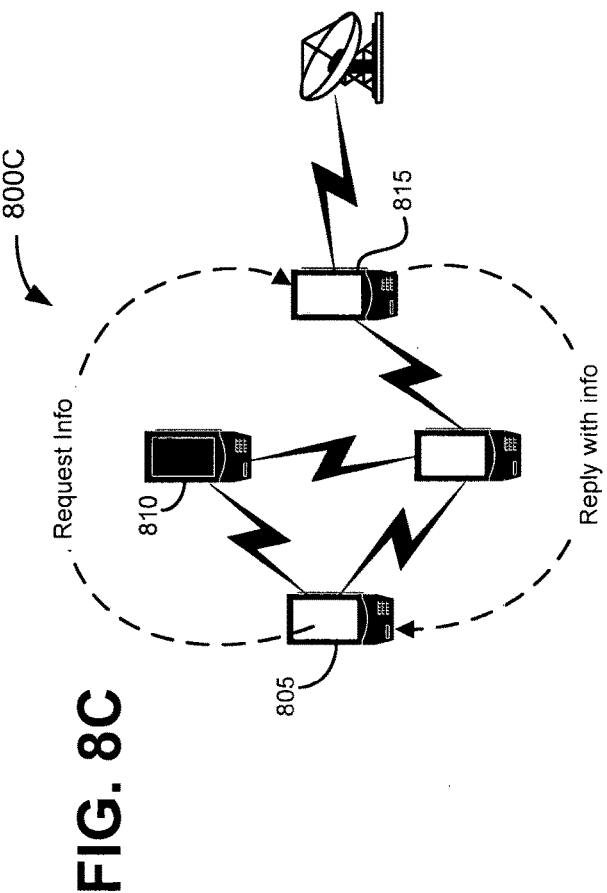
Figure 8B:
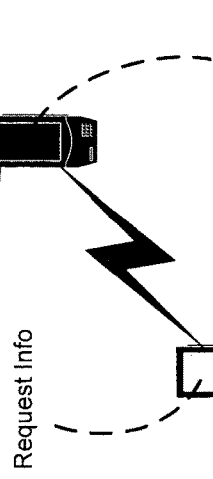

FIGS. 8A-8C show diagrams illustrating the distribution of information in a wireless mesh network 105. The information may include profiles, preferences, and user-specific information. In addition, the distribution operations described below may apply to the distribution of different types of content, such as messages, broadcasts, advertisements, text, voice, music, video, and/or other types of information.

Diagram 800A of FIG. 8A illustrates a user on a wireless device 805 accessing the information from a system server 820 (e.g., the instant messaging system 130 in FIG. 1). For example, a user on wireless device 805 may want to view a profile for a user on wireless device 810. The user on wireless device 805 sends a request to the system server 820, which may transmit the request through the data network 115. After receiving the request, the system server 820 replies to the wireless device 805 using the same path.

In another implementation, as shown in diagram 800b of FIG. 8B, wireless device 805 obtains information directly from the wireless device 810 without querying the server 820. For example, the wireless device 810 may locally store a profile. Locally storing a profile may provide a faster response time and/or afford resilience when access to the system service 820 is not available.

In yet another example, as shown in diagram 800c of FIG. 8C, the wireless device 805 may obtain information about wireless device 810 from wireless device 815. Wireless device 815 may have previously obtained information about wireless device 810 and hence, may support wireless device 805 with locally-cached information. As a result, the wireless device 810 is still able to access the requested information from a local neighbor without requesting access to the system server 820.

A wireless device may be configured to communicate with a communications service (e.g., the instant messaging system 130 in FIG. 1) without explicit instruction from a user, though a user may control how the wireless device communicates with the communications service. For example, a wireless device may interact with a communication service without explicit instructions by a user to ensure that the neighbors are discovered and participant lists are populated (e.g., by automatically running a self-configuring wireless routing protocol and instant messaging software). Presence information and the proximity information may be exchanged automatically using an automated agent configured to develop a network topology and identify identities on proximate wireless devices.

Instant messaging programs typically allow instant message senders to communicate in real-time with each other in a variety of ways. For example, an instant messaging program may allow instant message senders to send text as an instant message, transfer files, and communicate by voice. One example of an instant messaging communication application is AIM (America Online Instant Messenger). Although many of the operations were discussed with respect to instant messaging applications, the operations may be applicable to other messaging applications (e.g., voice communications, chat, and electronic mail messaging applications). In one example, the operations described above may be used by an animated avatar that acts as an information assistant conveying news, weather, and other information.

Figure 9:
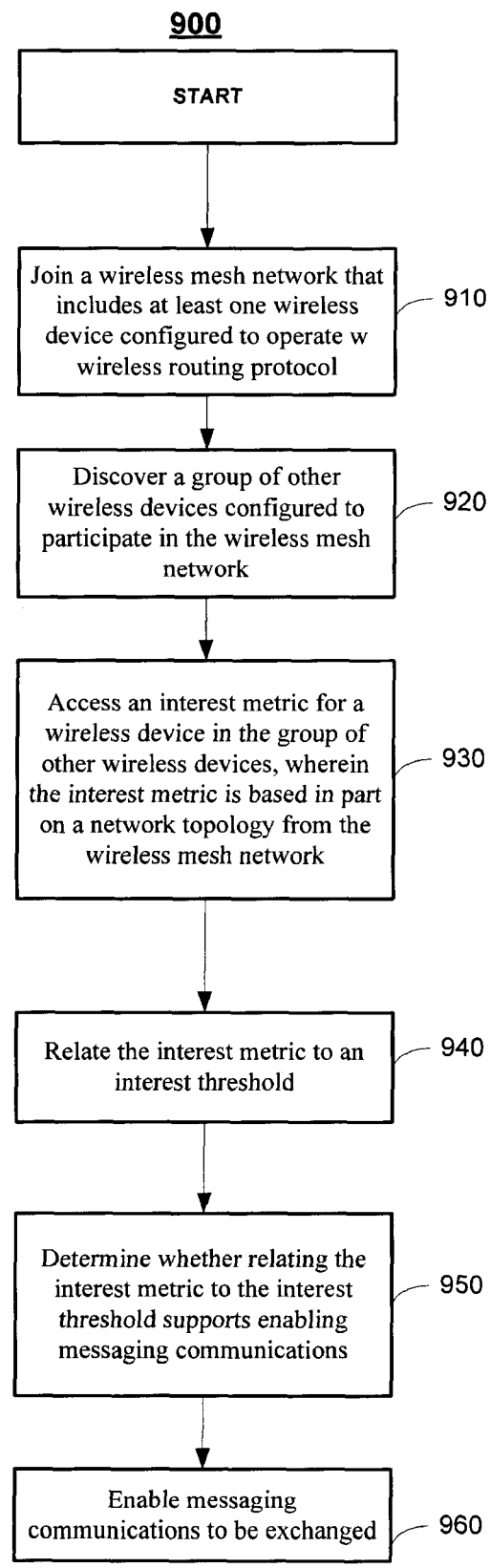
FIG. 9 is a flow chart of an exemplary process by which messaging communications are enabled.

FIG. 9 is a flow chart 900 of an exemplary process by which messaging communications are enabled. Initially, a wireless device joins the wireless mesh network that includes at least one wireless device configured to operate a wireless routing protocol (910). Joining the wireless mesh network may include initiating a connection to a wireless router device (e.g., a wireless access point or another wireless device) and/or transmitting a handshaking message to the wireless router device. The wireless router device may store information about the topology of the wireless mesh network and assist the wireless device in discovering neighbors (e.g., by providing a network topology and/or routing table). Alternatively or in addition, the wireless router device may register the newly-joined wireless device in its routing tables.

Next, the wireless device discovers a group of other wireless devices configured to participate in the wireless mesh network (920). The wireless device may discover the group of other wireless devices by broadcasting "HELLO" advertisements, by querying the wireless router device, and/or by using other discovery techniques. In one implementation, the wireless device discovers a network topology for a larger wireless mesh network using peer propagation techniques.

Once the wireless device discovers the group of other neighboring devices, the wireless device accesses an interest metric for another wireless device in the group of other wireless devices, with the interest metric being based in part on a network topology from the wireless mesh network (930). For example, the interest metric may be specified in terms of the number of network hops to the other wireless device or the strength of signal from the other wireless device. Alternatively, or in addition, the interest metric also may be specified in terms of network proximity combined with the geographic proximity or the characteristics of the other wireless device.

After accessing the interest metric, the wireless device relates the interest metric to an interest threshold and determines whether relating the interest metric to the interest threshold supports enabling messaging communications with the other wireless device (940-950). For example, if the interest metric for the other wireless device is greater than or equal to the threshold, then the wireless device enables messaging communications with the other wireless device. On the other hand, if the interest metric for the other wireless device is less than the threshold, then the wireless device may disable messaging communications with the other wireless device. The threshold may be specified in terms of the number of network hops, an amalgamation of network distance (e.g., hops) and available bandwidth, signal strength, and/or other characteristics (e.g., network stability).

Finally, if the interest threshold supports enabling messaging communications with the other wireless device, the wireless device enables messaging communications to be exchanged (960). For example, the wireless device may add online identities to a co-user list, initiate a chat or an instant messaging session, and/or initiate a file exchange with the other wireless device.

The described systems, methods, and techniques may be implemented in digital electronic circuitry, computer hardware, firmware, software, or in combinations of these elements. An apparatus using these techniques may include appropriate input and output devices, a computer processor, and a computer program product tangibly included in a machine-readable storage device for execution by a programmable processor. A process relying on these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly representing computer program instructions and data may include forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from spirit and scope of the claims. For example, the steps of the disclosed techniques and concepts may be performed in a different order and/or the components in the disclosed systems may be combined in a different manner and/or replaced or supplemented by other components. As another example, a screen name is used throughout to represent a unique identifier of an account, but any other unique identifier of an account may be used to identify an account. Other implementations are within the scope of the following claims.

What is claimed is:

1. A method comprising:
   discovering, by one or more processors of a first wireless device, a plurality of wireless devices in an ad-hoc network of wireless devices;
   determining, by the one or more processors, a number of hops from the first wireless device to a second wireless device of the discovered plurality of wireless devices;
   determining whether the determined number of hops is within a specified number of hops; and
   based on the determined number of hops being within the specified number of hops, broadcasting a presence of the first wireless device on the ad-hoc network of wireless devices to the second wireless device.

2. The method of claim 1, further comprising determining whether a metric meets a privacy preference and broadcasting the presence of the first wireless device on the ad-hoc network of wireless devices to the second wireless device based on the metric meeting the privacy preference.

3. The method of claim 2, wherein determining whether the metric meets the privacy preference comprises determining whether the metric meets the privacy preference for one of: a group associated with the first wireless device, a list associated with the first wireless device, or a user associated with the second wireless device.

4. The method as recited in claim 3, wherein determining whether the metric meets the privacy preference for one of: the group associated with the first wireless device, the list associated with the first wireless device, or the user associated with the second wireless device comprises determining whether a user associated with the first wireless device desires to be visible or invisible to the one of: the group associated with the first wireless device, the list associated with the first wireless device, or the user associated with the second wireless device.

5. The method claim 4, further comprising determining whether the second wireless device meets user specified neighbor selection settings and broadcasting the presence of the first wireless device on the ad-hoc network of wireless devices to the second wireless device based on the second wireless device meeting the user specified neighbor selection settings.

6. The method of claim 5, wherein determining whether the second wireless device meets user specified neighbor selection settings comprises determining whether the second wireless device includes one or more user specified characteristics.

7. The method of claim 2, wherein determining whether the metric meets the privacy preference comprises determining that a user of the second wireless device is included in a specified group of users.

8. The method of claim 7, further comprising making the user's identity visible to a user of the first client device.

9. A computer program product for use at a first client device, the computer program product comprising one or more non-transitory computer readable storage medium having stored thereon computer-executable instructions that, when executed by a processor of the first client device, cause the first client device to:
discover a plurality of wireless devices in an ad-hoc network of wireless devices;
determine a number of hops from the first wireless device to a second wireless device of the discovered plurality of wireless devices;
determine whether the determined number of hops is within a specified number of hops; and
based on the determined number of hops being within the specified number of hops, broadcast a presence of the first wireless device on the ad-hoc network of wireless devices to the second wireless device.

10. The computer program product of claim 9, wherein the computer-executable instructions, when executed, further cause the first client device to determine whether a metric meets a privacy preference and broadcast the presence of the first wireless device on the ad-hoc network of wireless devices to the second wireless device based on the metric meeting the privacy preference.

11. The computer program product of claim 10, wherein the computer-executable instructions, when executed, further cause the first client device to determine whether the metric meets the privacy preference for one of: a group associated with the first wireless device, a list associated with the first wireless device, or a user associated with the second wireless device.

12. The computer program product of claim 9, wherein the computer-executable instructions, when executed, further cause the first client device to determine whether the second client device meets user specified neighbor selection settings and broadcast the presence of the first wireless device on the ad-hoc network of wireless devices to the second wireless device based on the second wireless device meeting the user specified neighbor selection settings.

13. The computer program product of claim 9, wherein computer-executable instructions that, when executed, cause the first client device to determine that a user of the second wireless device is included in a specified group of users and broadcast the presence of the first wireless device on the ad-hoc network of wireless devices to the second wireless device based on the user of the second wireless device being included in the specified group of users.

14. The computer program product of claim 13, wherein the computer-executable instructions, when executed, further cause the first client device to determine that a third wireless device is not within the specified number of hops and make a user of the third wireless device identity invisible to a user of the first wireless device based on the third wireless device not being within the specified number of hops.

15. A system comprising:
at least one processor; and
a non-transitory computer readable storage medium storing instructions that, when executed by the at least one processor, cause the system to:
discover a plurality of wireless devices in an ad-hoc network of wireless devices;
determine a number of hops from a first wireless device to a second wireless device of the discovered plurality of wireless devices;
determine whether the determined number of hops is within a specified number of hops; and
based on the determined number of hops being within the specified number of hops, broadcast a presence of the first wireless device on the ad-hoc network of wireless devices to the second wireless device.

16. The system of claim 15, wherein the instructions, when executed by the at least one processor, further cause the system to determine whether a metric meets a privacy preference and broadcast the presence of the first wireless device on the ad-hoc network of wireless devices to the second wireless device based on the metric meeting the privacy preference.

17. The system of claim 16, wherein determining whether the metric meets the privacy preference comprises determining that a user of the second wireless device is included in a specified group of users.

18. The system of claim 15, wherein the method further comprises providing a user interface at the first wireless device that includes other wireless devices in the ad-hoc network of wireless devices within the specified number of hops.

19. The system of claim 15, wherein the method further comprises enabling communications to be exchanged between the first wireless device and second wireless device by identifying a communications pathway from the first wireless device to the second wireless device through a plurality of other wireless devices in the ad-hoc network of wireless devices.

20. The system of claim 19, wherein the method further comprises determining a geographic location of the second wireless device and enabling communications to be exchanged between the first wireless device and second wireless device based on the geographic location of the second wireless device being within a threshold distance of the first wireless device.

21. The system of claim 15, wherein the method further comprises generating a network topology of the ad-hoc network of wireless devices by sending discovery packets to wireless device within one hop of the first wireless device.

* * * * *